(12) United States Patent
Yumita et al.

(10) Patent No.: US 7,005,758 B2
(45) Date of Patent: Feb. 28, 2006

(54) HYDRAULIC POWER GENERATING DEVICE

(75) Inventors: Yukinobu Yumita, Nagano (JP); Hideo Kumagai, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 56 days.

(21) Appl. No.: 10/849,675

(22) Filed: May 19, 2004

(65) Prior Publication Data

US 2005/0006903 A1     Jan. 13, 2005

(30) Foreign Application Priority Data

May 19, 2003  (JP)  .............................. 2003-140958
May 19, 2003  (JP)  .............................. 2003-140959

(51) Int. Cl.
*F03B 13/00*     (2006.01)
(52) U.S. Cl. ........................................ 290/54; 290/43
(58) Field of Classification Search ................. 290/43, 290/54
See application file for complete search history.

(56) References Cited

U.S. PATENT DOCUMENTS

| | | | | |
|---|---|---|---|---|
| 4,731,545 A | * | 3/1988 | Lerner et al. .................. | 290/54 |
| 4,746,808 A | * | 5/1988 | Kaeser .......................... | 290/52 |
| 5,043,592 A | * | 8/1991 | Hochstrasser ................. | 290/52 |
| 6,509,652 B1 | * | 1/2003 | Yumita .......................... | 290/54 |
| 6,559,553 B1 | * | 5/2003 | Yumita et al. ................. | 290/54 |
| 6,768,218 B1 | * | 7/2004 | Yumita .......................... | 290/54 |
| 6,885,114 B1 | * | 4/2005 | Baarman et al. .............. | 290/43 |

FOREIGN PATENT DOCUMENTS

| | | | |
|---|---|---|---|
| EP | 1306962 A1 | * | 5/2003 |
| EP | 1384959 A2 | * | 1/2004 |
| JP | 2002-081361 | | 3/2002 |
| JP | 2002081361 A | * | 3/2002 |
| JP | 2002081363 A | * | 3/2002 |
| JP | 2002089429 A | * | 3/2002 |
| JP | 2002235651 A | * | 8/2002 |

* cited by examiner

*Primary Examiner*—Joseph Waks
(74) *Attorney, Agent, or Firm*—Reed Smith LLP (57) ABSTRACT

A hydraulic power generating device includes a main body case forming a flow passage provided with a water wheel chamber between a fluid inlet port and a fluid outlet port, a cover covering the main body case, a water wheel for power generation disposed in the water wheel chamber, a rotor magnet for rotating in cooperation with the water wheel. An ejection port including a groove is formed on the main body case for ejecting fluid toward the blades of the water wheel at a high speed and an protrusion part is formed on the cover for adjusting the aperture area of the ejection port by entering into the groove. Further, a discharge space is formed at a downstream position of the water wheel chamber so as to be in communication with the fluid outlet port, to which fluid after having rotated the water wheel is ejected and a stagnation preventing protrusion part is formed in the discharge space to facilitate flow of air bubbles to the fluid outlet port.

12 Claims, 11 Drawing Sheets

HYDRAULIC POWER GENERATING DEVICE

CROSS-REFERENCE TO RELATED APPLICATIONS

This application claims priority to Japanese Application No. 2003-140958 filed May 19, 2003 and priority to Japanese Application No. 2003-140959 filed May 19, 2003, which are incorporated herein by reference.

BACKGROUND OF THE INVENTION a) Field of the Invention

The present invention relates to a hydraulic power generating device in which hydraulic power generation is performed by using the flow of city water ejected from a faucet or the like.

b) Description of the Related Art

An automatic faucet device has been spreading which is constructed such that water flows out from a faucet automatically when a hand is stretched out at a downward position of the faucet and a sensor detects it. Further, in recent years, a small-sized hydraulic power generating device has been provided at a midway position in the flow passage of city water to store electric power obtained by the hydraulic power generating device and to supply the stored electric power to the sensor circuit of an automatic faucet device.

A conventional hydraulic power generating device includes a main body case forming a flow passage provided with a water wheel chamber between a fluid inlet port and a fluid outlet port and a cover covering the upper face of the main body case. An ejection port includes a groove formed on the upper face of the main body case so as to be located between the main body case and the cover body for ejecting fluid toward the blades of a water wheel for power generation within the water wheel chamber at a high speed. The fluid is ejected toward the blades of the water wheel at a high speed to generate electric power. (for example, refer to Japanese Patent Laid-Open No. 2002-81361).

In such hydraulic power generating device, the fluid is ejected toward the blades of the water wheel within the water wheel chamber from the ejection port at a high speed and thus the water wheel for power generation can be efficiently rotated even at a little flow rate.

Also, in the case that a discharge space in communication with a fluid outlet port is constructed at a downward position of the water wheel chamber, the fluid having rotated the water wheel flows on the lower side smoothly in comparison with the construction that the water wheel chamber is directly in communication with the fluid outlet port and thus the efficiency of power generation improves.

Since such hydraulic power generating device is used under various conditions, hydraulic power generating devices of various specifications are required. For example, when the resistance of water passage or the flow rate is different, the quantity of power generation also varies. Therefore, the aperture size of the ejection port for ejecting the fluid to the blades of the water wheel is required to be changed depending on the operating condition. However, when the main body case is produced for every specification, the cost of the molding die for producing the main body case is remarkably increased and a short time of delivery can not be attained.

Further, when the discharge space in communication with the fluid outlet port is constructed at a downward position of the water wheel chamber, an impact sound may occur although the efficiency of power generation is improved. As a result that the present inventors have investigated thoroughly about the cause of such an impact sound, he has found that, in the discharge space, a part of the fluid circulates at a high speed and air bubbles entered into the fluid are not discharged toward the fluid outlet port from the discharge space to turn around while repeating deformation such as compression and expansion, which causes to generate an impact sound.

OBJECT AND SUMMARY OF THE INVENTION

In view of the problems described above, it is an object and advantage of the present invention to provide a hydraulic power generating device which is capable of reducing cost and attaining a short time of delivery by changing the aperture area of an ejection port without significantly changing its design.

Further, it is another object and advantage of the present invention to provide a hydraulic power generating device which is capable of preventing the occurrence of an impact sound due to air bubbles even when a discharge space for enhancing the efficiency of power generation is constructed between a water wheel chamber and a fluid outlet port.

In order to achieve the above object and advantage, according to an embodiment of the present invention, there is provided a hydraulic power generating device including a main body case which forms a flow passage provided with a water wheel chamber between a fluid inlet port and a fluid outlet port, a cover which covers an upper face of the main body case, a water wheel for power generation which is disposed in the water wheel chamber, a rotor magnet which rotates in cooperation with the water wheel, at least an ejection port having a groove which is formed on one of the main body case and the cover for ejecting fluid toward blades of the water wheel at a high speed, and at least an protrusion part which is formed on the other of the main body case and the cover for adjusting an aperture area of the ejection port by entering into the groove.

The ejection port is formed of the groove which is formed on one of the main body case and the cover and the other of the main body case and the cover is provided with the protrusion part for adjusting the aperture area of the ejection port by entering into the groove. According to the construction described above, the member which is easier for design change or cheaper for the cost of molding die can be adopted as the member to form the protrusion part with a required size for adjusting the aperture area of the ejection port. Consequently, the aperture area can be adjusted without changing design of the ejection port and thus the hydraulic power generating device can be manufactured at a low cost and a short time of delivery.

In the hydraulic power generating device in accordance with an embodiment of the present invention, the groove for forming the ejection port is formed on the upper face of the main body case and the protrusion part is formed on an under face of the cover. In other words, the cover which is easier for design change and cheaper for the cost of molding die is provided with the protrusion part for adjusting the aperture area of the ejection port. In this case, the aperture area of the ejection port can be easily adjusted by selecting one of a cover without the protrusion part, a cover with the protrusion part, and a cover having the protrusion part with a different protruding size. Therefore, the hydraulic power generating device can be manufactured at a further low cost and a further short time of delivery.

In the hydraulic power generating device in accordance with an embodiment of the present invention, a ring-shaped recessed part is formed on the upper face of the main body case, a ring-shaped conduit passage is constructed by the ring-shaped recessed part of the main body case and the cover, a plurality of ejection ports formed on the upper face of the main body case for ejecting fluid toward the blades of the water wheel for power generation from the ring-shaped conduit passage, and a plurality of protrusion parts formed on the cover for adjusting aperture areas of the respective ejection ports. According to the construction described above, fluid is ejected to the blades of the water wheel from the plurality of ejection ports and thus the efficiency of power generation is improved. Also in this case, the respective aperture areas of the plurality of ejection ports can be adjusted only by providing the plurality of protrusion parts on the cover.

In the hydraulic power generating device in accordance with an embodiment of the present invention, the plurality of protrusion parts include protrusion parts with different protruding sizes. When the plurality of the ejection ports are formed, the flowing velocities ejected from the ejection ports may vary according to the positional relations with respect to the conduit passage. However, according to the construction described above, the protruding sizes of the plurality of protrusion parts are set to be different in such a manner that the flowing velocities ejected from the respective ejection ports cancel the variations of the flowing velocities each other to enhance the efficiency of power generation.

In the hydraulic power generating device in accordance with an embodiment of the present invention, the fluid is water ejected from a faucet. Such hydraulic power generating device may be, for example, used to supply electric power to the sensor section of an automatic faucet device.

In addition, in order to achieve the above object and advantage, according to an embodiment of another present invention, there is provided a hydraulic power generating device including a flow passage provided with a water wheel chamber between a fluid inlet port and a fluid outlet port, a water wheel for power generation which is disposed in the water wheel chamber, a rotor magnet which rotates in cooperation with the water wheel, a discharge space formed at a downstream position of the water wheel chamber so as to be in communication with the fluid outlet port, to which fluid after having rotated the water wheel is ejected; and a stagnation preventing protrusion part which is formed in the discharge space to facilitate the flow of air bubbles to the fluid outlet port.

According to the construction described above, the discharge space is formed at a downstream position of the water wheel chamber so as to be in communication with the fluid outlet port. Therefore, the fluid having turned the water wheel flows downstream side smoothly and thus a high degree of efficiency for power generation can be attained. Further, when the discharge space is constructed as described above, the fluid circulates within the discharge space at a high speed and thus air bubbles mixed in the fluid are hard to be ejected from the discharge space toward the fluid outlet port. However, in the embodiment of the present invention, since the stagnation preventing protrusion part is formed on the bottom face of the discharge space, the circulation of fluid in the discharge space is prevented and the fluid is facilitated to flow to the fluid outlet port along with the air bubbles. Therefore, since the ejection of the fluid from the discharge space to the fluid outlet port is facilitated by the stagnation preventing protrusion part, unnecessary resistance to the water wheel due to the return current or circulation of the water is reduced. Accordingly, the efficiency of the power generation is further improved.

In the hydraulic power generating device in accordance with an embodiment of the present invention, the water wheel chamber and the discharge space are respectively formed in a cylindrical space. When the water wheel chamber and the discharge space are formed in the cylindrical space, the fluid is easy to circulate within the discharge space at a high speed along with air bubbles and thus the air bubbles mixed in the fluid are hard to be ejected from the discharge space toward the fluid outlet port. However, since the stagnation preventing protrusion part is formed in the discharge space to facilitate to flow out to the fluid outlet port along with the air bubbles, the occurrence of impact sounds which are generated by the air bubbles turning while repeating deformation such as compression and expansion can be prevented. Therefore, the efficiency of the power generation is further improved.

In the hydraulic power generating device in accordance with an embodiment of the present invention, the stagnation preventing protrusion part is formed on the downstream side face of the discharge space at the downstream position of the water wheel chamber. In the discharge space, the fluid circulates along the downstream side bottom face at a high speed. Therefore, when the stagnation preventing protrusion part is formed on the downstream side bottom face, the fluid can be effectively facilitated to flow out to the fluid outlet port along with air bubbles.

In the hydraulic power generating device in accordance with an embodiment of the present invention, a boss is formed on the downstream side bottom face of the discharge space for supporting the lower end part of the rotation center shaft of the water wheel. When the boss is formed on the downstream side bottom face of the discharge space, the fluid and air bubbles are easy to be circulated around the boss. However, since the stagnation preventing protrusion part is formed in the discharge space, the occurrence of impact sounds due to repeating that air bubbles collide on the inner face of the discharge space can be prevented and the efficiency of the power generation is further improved.

In the hydraulic power generating device in accordance with an embodiment of the present invention, the stagnation preventing protrusion part is a rib which extends from the boss in a radial direction. According to the construction described above, the fluid is effectively prevented along with air bubbles from circulating around the boss to facilitate to flow out to the fluid outlet port along with the air bubbles.

In the hydraulic power generating device in accordance with an embodiment of the present invention, the stagnation preventing protrusion part is formed to be extended from the boss toward the fluid outlet port. According to the construction described above, the fluid is effectively facilitated to flow out to the fluid outlet port along with the air bubbles.

In the hydraulic power generating device in accordance with an embodiment of the present invention, the fluid is water ejected from a faucet. Such hydraulic power generating device may be, for example, used to supply electric power to the sensor section of an automatic faucet device. When the fluid is water ejected from a faucet, air bubbles are remarkably easy to be mixed in the water. The present invention is effectively applied to such hydraulic power generating devices.

Other features and advantages of the invention will be apparent from the following detailed description, taken in

DESCRIPTION OF THE PREFERRED EMBODIMENTS

Hydraulic power generating devices in accordance with preferred embodiments of the present invention will be described below with reference to the accompanying drawings.

First Embodiment

Overall Construction

Figure 1:
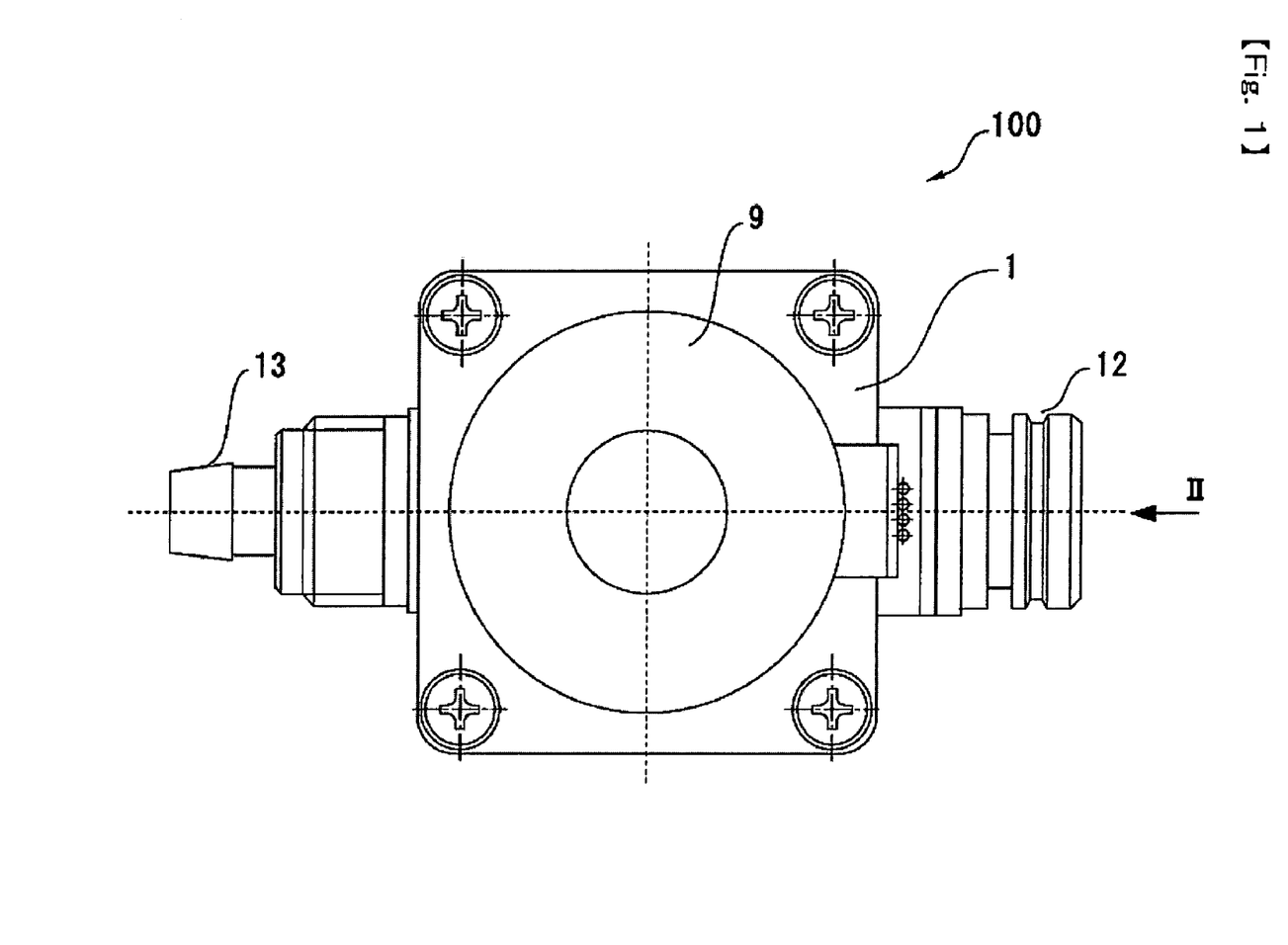
FIG. 1 is a plan view showing a small-sized hydraulic power generating device in accordance with a first embodiment of the present invention.
Figure 2:
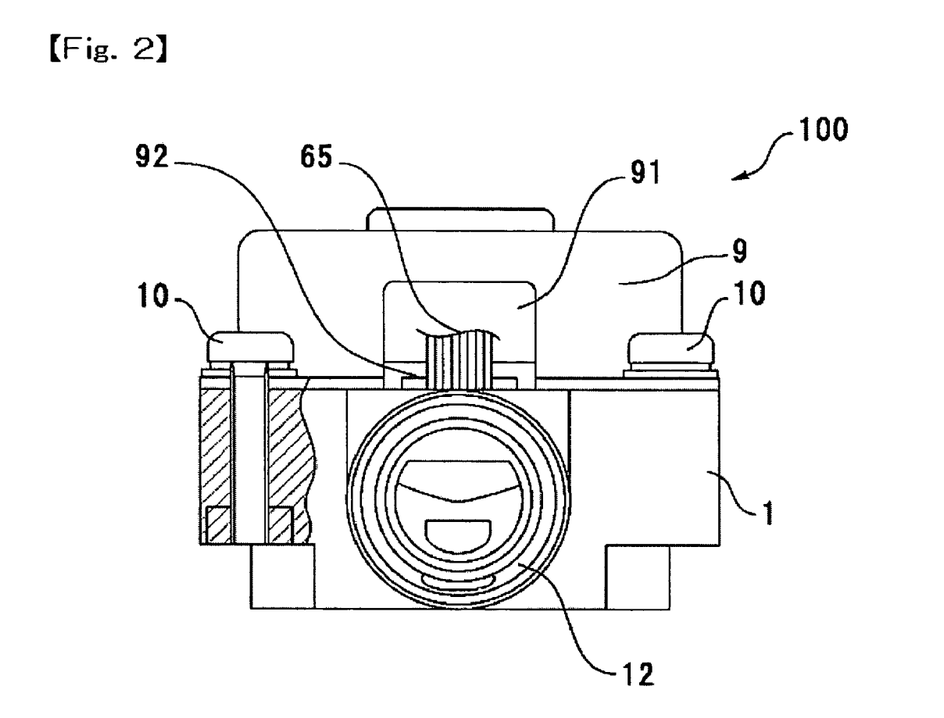
FIG. 2 is a side view of the small-sized hydraulic power generating device viewed from the direction shown by the arrow II in FIG. 1.
Figure 3:
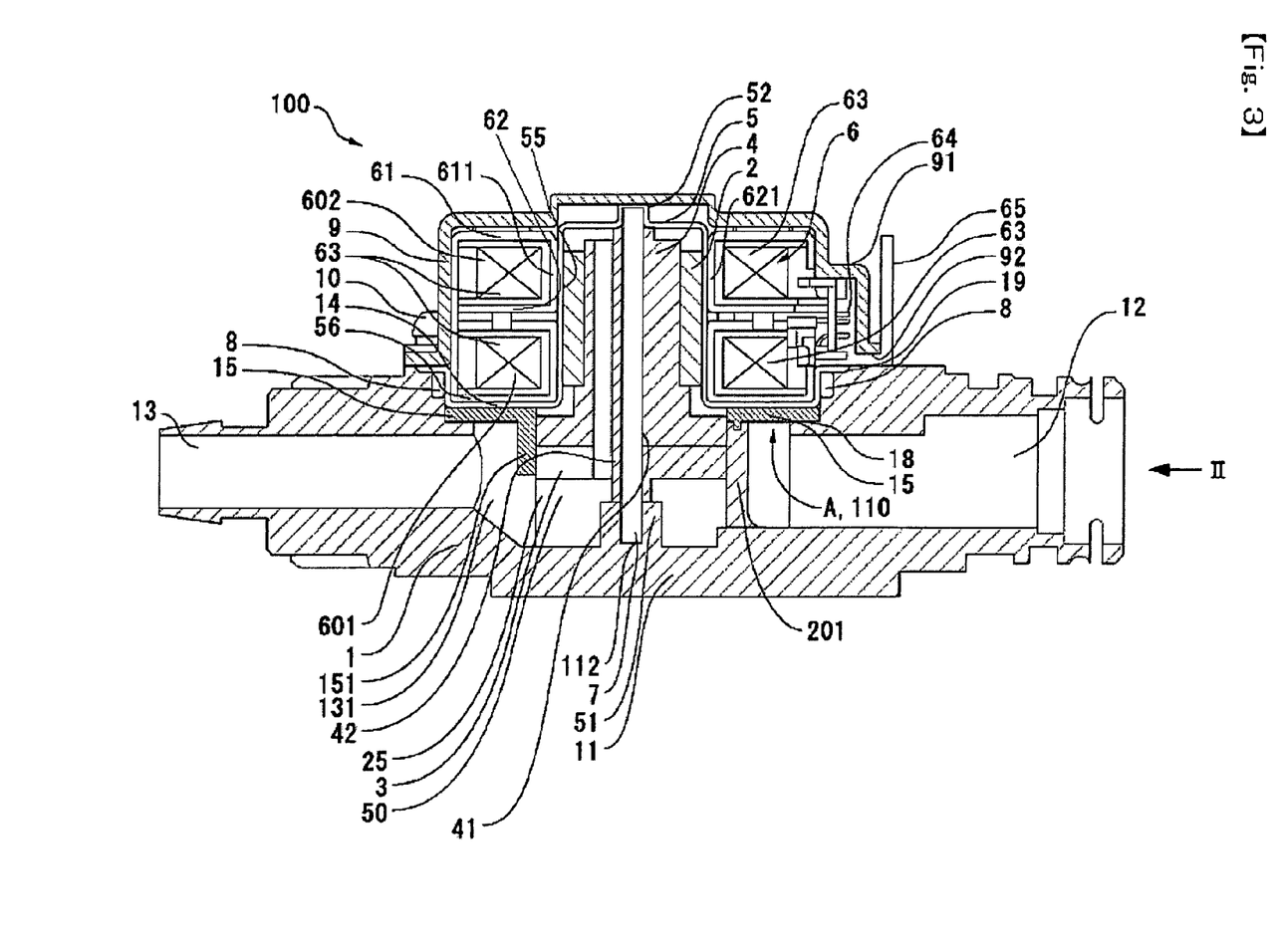
FIG. 3 is a longitudinal sectional view showing the small-sized hydraulic power generating device shown in FIG. 1.

FIG. 1 is a plan view showing a small-sized hydraulic power generating device to which the present invention is applied. FIG. 2 is a side view of the small-sized hydraulic power generating device viewed from the direction shown by the arrow II in FIG. 1. FIG. 3 is a longitudinal sectional view showing the small-sized hydraulic power generating device shown in FIG. 1.

As shown in FIGS. 1, 2 and 3, a hydraulic power generating device 100 in accordance with a first embodiment of the present invention includes a main body case 1 provided with a fluid inlet port 12, a fluid outlet port 13 and a flow passage 110, a water wheel chamber 50 formed in the main body case 1, a support shaft 7 erected upwardly at a center position of the water wheel chamber 50, a rotation body 4 rotatably supported by the support shaft 7, a cup-shaped case 5 made of stainless steel which is mounted on the main body case 1 so as to enclose the rotation body 4, a stator part 6 disposed on the outer peripheral face of a cylindrical part 55 of the cup-shaped case 5, and a resin case 9 attached on the main body case 1 so as to cover the stator part 6. A shaft hole 41 (bearing) into which the support shaft 7 is fit is formed at a center position of the rotation body 4, and a water wheel 3 for power generation is constructed at the lower end side of the rotation body 4 and a rotor magnet 2 is fixed on the outer peripheral face of an upper half portion of the rotation body 4.

In the first embodiment, after the lower end part of the support shaft 7 is press-fitted and fixed into the main body case 1, a ring-shaped cover 15 is mounted on the main body case 1 and then the rotation body 4 is mounted on the support shaft 7. Next, the cup-shaped case 5 around which an "O"-ring 8 for seal is fitted is press-fitted into the main body case 1, the stator part 6 is mounted on the outer peripheral face of the cylindrical part 55 of the cup-shaped case 5, and then the resin case 9 is attached on the main body case 1 so as to cover the stator part 6. Also, an injection part 30 for injecting water to the water wheel 3 for power generation from the outer side in the radial direction as described below with reference to FIG. 5 is formed by using the ring-shaped cover 15 which covers the water wheel chamber 20 of the main body case 1.

Construction of Main Body Case and Cover

Figure 4:
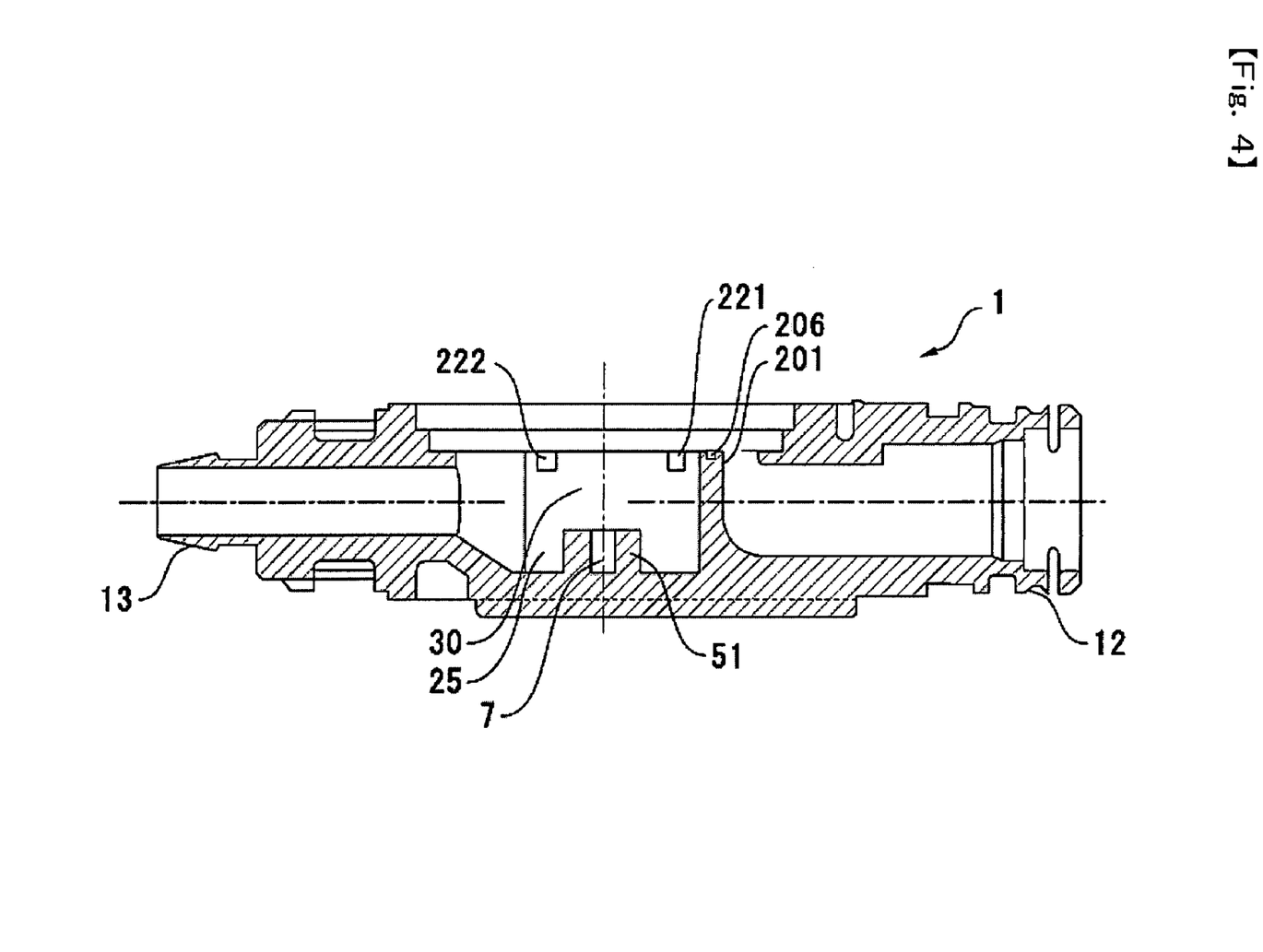
FIG. 4 is a sectional view showing a main body case used in the small-sized hydraulic power generating device shown in FIG. 1.
Figure 5:
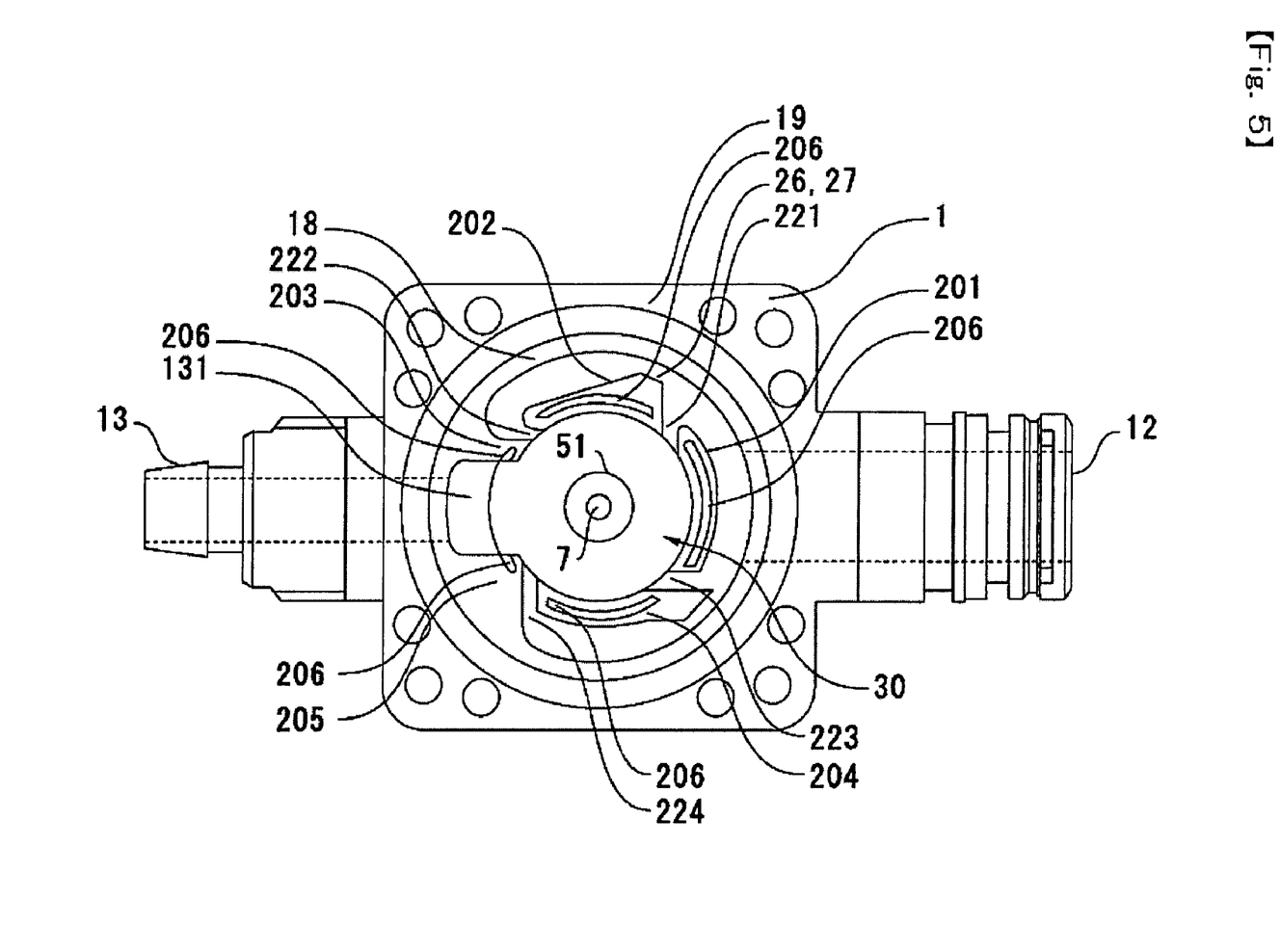
FIG. 5 is a plan view showing the main body case used in the small-sized hydraulic power generating device shown in FIG. 1.

FIGS. 4 and 5 are respectively a sectional view and a plan view of the main body case used in the hydraulic power generating device shown in FIG. 1. FIGS. 6(A) and 6(B) are respectively a bottom view and a sectional view showing the cover constructing an ejection port along with the main body case in the hydraulic power generating device shown in FIG. 3.

In the hydraulic power generating device 100 in the first embodiment, the main body case 1 is provided with a main body part 11 and a pipe-shaped fluid inlet port 12 and a pipe-shaped fluid outlet port 13 respectively protruding on both sides of the main body part 11. An injection wall part 201 is formed so as to be erected on the fluid inlet port 12 side in the inside of the main body part 11 to partition the water wheel chamber 50. The water wheel chamber 50 is constructed by the injection wall part 201 and the inner wall of the main body part 11.

A bearing hole 112 for supporting the lower end of the support shaft 7 is formed at the bottom part of the water wheel chamber 50. The bearing hole 112 is formed on the upper face of a boss 51 which is formed on the bottom part of the water wheel chamber 50. When the rotation body 4 is attached on the support shaft 7, a discharge space 25 is formed at the downstream position of the water wheel 3 such that the height of the discharge space 25 is determined by adding the height size of a projection 42 protruding toward the lower part of the water wheel 3 of the rotation body 4 to the height size of the boss 51.

The injection part 30 narrows down the flow passage 110 of the water flowing from the fluid inlet port 12 to make the momentum of the water stronger and eject the water to the blades of the water wheel 3 for power generation.

In order to construct the injection part 30 in this embodiment of the present invention, as shown in FIGS. 4 and 5, two ring-shaped faces 18 and 19 are formed on the main body case 1 at different levels on the circumference of the water wheel chamber 50. A ring-shaped recessed part 26 is formed in the inner ring-shaped face 18 and, on the inner side of the ring-shaped recessed part 26, five injection wall parts 201, 202, 203, 204 and 205 are formed on the upper portion of the side wall partitioning the water wheel chamber 50 so as to be extended in the peripheral direction. As a result, a ring-shaped conduit passage 27 is constructed between the main body case 1 and the cover 15 so as to surround the upward portion of the water wheel chamber 50. The portion of the ring-shaped recessed part 26 which is located on the outer peripheral side of the injection wall part 201 is in communication with the fluid inlet port 12.

Figure 6:
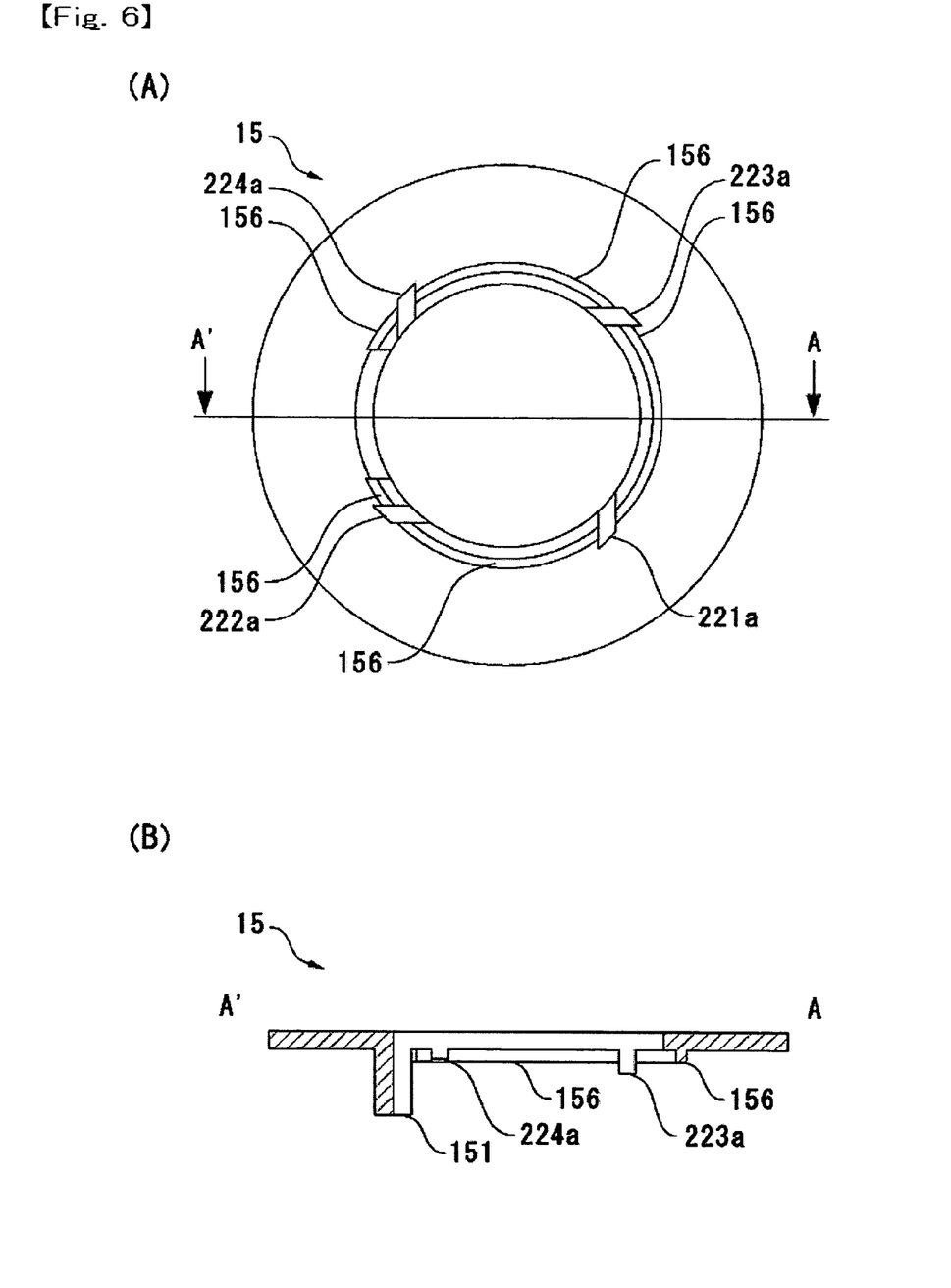
FIG. 6(A) is a bottom view showing a cover for forming an ejection port along with the main body case in the small-sized hydraulic power generating device shown in FIG. 1.
FIG. 6(B) is a sectional view showing the cover.

An annular cover 15 shown in FIG. 6 is put on the ring-shaped face 18. The inner diameter of the cover 15 is the same as the inner diameter of the water wheel chamber 50, and the outer diameter of the cover 15 is slightly smaller than the inner diameter of the step part formed between the ring-shaped faces 18 and 19. Therefore, the inner peripheral portion of the cover 15 is put on the upper faces of five injection wall parts 201, 202, 203, 204 and 205 formed extending in the peripheral direction, and its outer peripheral portion is put on the ring-shaped face 18.

A narrow groove 206 is respectively formed on the upper faces of the injection wall parts 201, 202, 203, 204 and 205, and the cover 15 is provided with protrusion parts 156 each of which fits into the narrow groove 206. Therefore, when the cover 15 is put on the main body case 1, the protrusion part 156 fits into the groove 206 to prevent water from leaking from the clearance between the cover 15 and the injection wall parts 201, 202, 203, 204 and 205.

Figure 7:
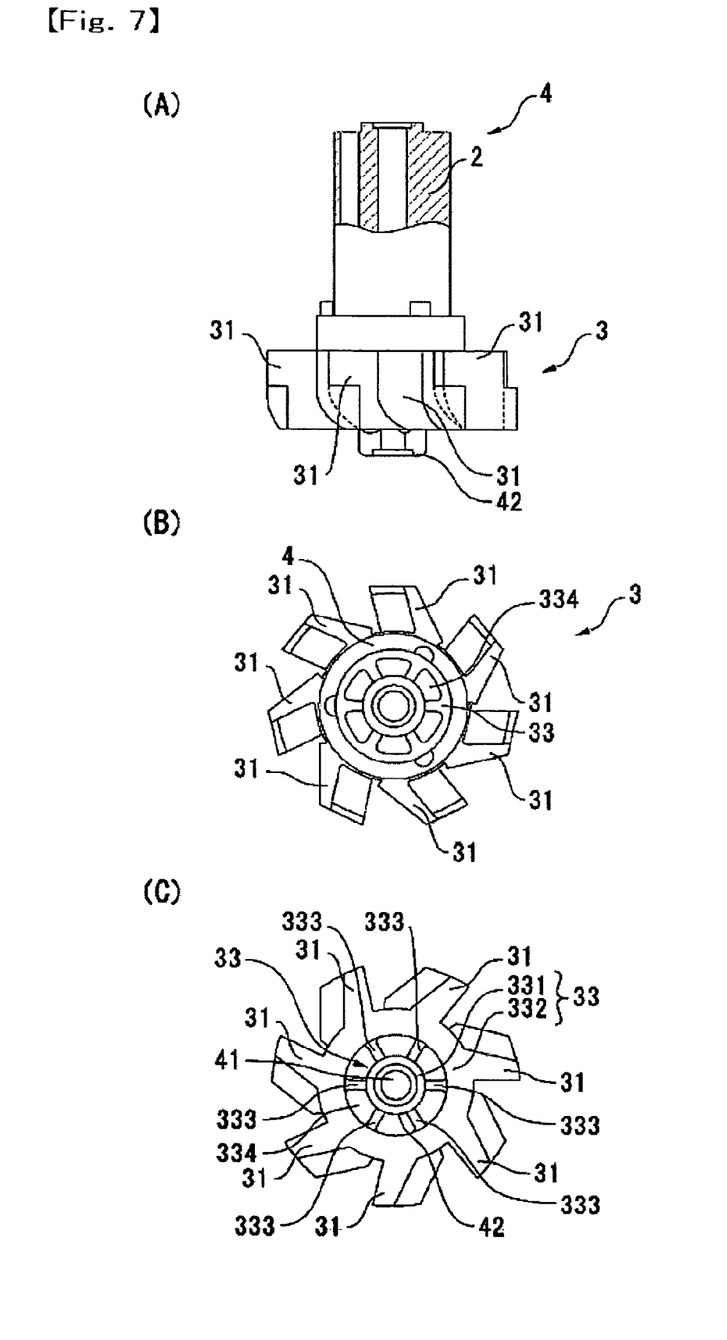
FIG. 7(A) is a side view showing a rotation body of which one part is cut away and which is used in the small-sized hydraulic power generating device shown in FIG. 1.
FIG. 7(B) is a plan view of the rotation body.
FIG. 7(C) is a bottom view of the rotation body.

When the cover 15 is placed on the upper faces of the injection wall parts 201, 202, 203, 204 and 205, the cover 15 closes the conduit passage 27 and constructs a plurality of ejection ports 221, 222, 223 and 224 by using a narrow groove-shaped cut-out portion between the injection wall parts 201, 202, 203, 204 and 205, which respectively open on the inner peripheral face of the water wheel chamber 50. The respective ejection ports 221, 222, 223 and 224 are opened at a position around the water wheel 3 disposed in the water wheel chamber 50 to eject the water flowed from the fluid inlet port 12 of the main body case 1 toward the blades 31, which are described below with reference to FIG. 7, from the outer side of the water wheel 3 in the radial direction.

In addition, in the first embodiment, ribs (protrusion part) 221a, 222a, 223a and 224a are formed on the portions of the under face of the cover 15 corresponding to the ejection ports 221, 222, 223 and 224 in such a manner that the ribs respectively enter into the corresponding ejection ports 221, 222, 223 and 224 to adjust the respective aperture areas of the ejection ports 221, 222, 223 and 224.

Also, in this embodiment, the respective aperture areas of the ejection ports 221, 222, 223 and 224 are adjusted by the protruding sizes of the ribs 221a, 222a, 223a and 224a. In other words, as shown in FIG. 6(B), the protruding sizes of the ribs 221a and 224a corresponding to the ejection ports 221 and 224 whose flow rates are larger are formed to be smaller to increase the aperture areas of the ejection ports 221 and 224. On the contrary, the protruding sizes of the ribs 222a and 223a corresponding to the ejection ports 222 and 223 whose flow rates are smaller are formed to be larger to decrease the aperture areas of the ejection ports 222 and 223. Therefore, the water is ejected toward the blades 31 with the flow rates approximately equal to each other at the ejection ports 221, 222, 223 and 224.

The cover 15 is provided with a plate-like part 151 extending toward the lower side. The plate-like part 151 covers the lateral side of the water wheel 3 in a communicating portion 131 between the water wheel chamber 50 and the fluid outlet port 13 as shown in FIG. 3.

Construction of Power Generating Section

In FIG. 3, when the cover 15 is attached on the main body case 1, a recessed part 14 is formed on the upper face of the cover 15, and thus the under face of the cup shaped case 5 is fitted into the recessed part 14. The cup shaped case 5 is provided with a flange portion extending toward the outer peripheral side from the lower end of the central cylindrical part 55. The outer peripheral side of the flange portion is bent upward and then bent outward to form an annular portion 56, which is fitted into the recessed part 14. At this time, an O-ring 8 is disposed between the outer peripheral portion of the annular portion 56 and recessed part 14 to ensure the water-tight condition. In the cup shaped case 5, a bearing portion 52 for supporting the upper end of the support shaft 7 is formed at the upper face of the cylindrical part 55.

A stator part 6 constructed in an annular manner is equipped on the cylindrical part 55 of the cup shaped case 5, which is put on the main body case 1 as described above. The stator part 6 comprises two phases 601 and 602 which are superposed in the axial direction. Each of the phases 601 and 602 includes an outer yoke 61, outer pole teeth 611 integrally formed on the outer yoke 61, an inner yoke 62, inner pole teeth 621 integrally formed on the inner yoke 62, and a coil 63 wound around a coil bobbin. The winding start portion and the winding end portion of the coil 63 are respectively connected to terminal parts 64.

Under the state that the stator part 6 constructed above is fitted on the outer portion of the cylindrical part 55 of the cup shaped case 5, magnetic flux flows between the respective pole teeth 611 and 621 of the stator part 6 and the rotor magnet 2 mounted on the rotation body 4. Therefore, when the entire rotation body 4 rotates along with the water wheel 3, the flow of the magnetic flux varies and an induced voltage is generated in the coil 63 in the direction preventing the variation of the magnetic flux. The induced voltage is detected from the terminal parts 64. The induced voltage which is detected is converted into a direct current and rectified through a predetermined circuit (not shown in the drawing) and then charged in a battery.

A resin case 9 is put on the stator part 6 so as to cover it, and the resin case 9 is fixed to the main body case 1 along with the cup shaped case 5 by screws 10. The resin case 9 includes a hood part 91 covering the terminal parts 64 as shown in FIGS. 2 and 3. The hood part 91 is provided with a pulling-out part 92 through which lead wires 65 whose one ends are connected to the terminal parts 64 are pulled out outside. A seal agent (not shown in the drawing) for sealing between the outside and the stator part 6 is filled in the pulling-out part 92 to prevent water from entering into the stator part 6 through the pulling-out part 92 from the external.

Construction of Water Wheel for Power Generation

FIG. 7(A) is a side view showing the rotation body of which one part is cut away used in the small-sized hydraulic power generating device shown in FIG. 3, FIG. 7(B) is a plan view of the rotation body, and FIG. 7(C) is a bottom view of the rotation body.

As shown in FIGS. 7(A), 7(B) and 7(C), the water wheel 3 for power generation is constructed of a body part 33 formed at a lower end part of the rotation body 4 and blades 31 formed to be protruded radially from the body part 33. The body part 33 comprises a small cylindrical part 331 having a shaft hole 41, a large cylindrical part 332 whose diameter is larger than the small cylindrical part 331, and rib parts 333 connecting both the cylindrical parts 331 and 332. Penetrating portions 334 are provided between both the cylindrical parts 331 and 332 so as to penetrate in the axial direction such that water is circulated in the water wheel chamber 50 to make the rotation of the rotation body 4 (water wheel 3 for power generation) smooth.

A mid portion of each of the blades 31 is formed in a curved shape so as to easily receive the pressure of water ejected from the respective ejection ports 221, 222, 223 and 224. Therefore, the water flowing from the fluid inlet port 12 is narrowed down by the respective ejection ports 221, 222, 223 and 224 to be ejected and impact to the blades 31 at a high pressure, and thus the hydraulic power causes to rotate the water wheel 3 about the support shaft 7 as its rotation center.

The rotor magnet 2 is fitted on the upper half portion of the rotation body 4. Multi-pole magnetizing is performed on the outer peripheral face of the rotor magnet 2.

In the hydraulic power generating device 100 as constructed above, the water flowing from the fluid inlet port 12 passes through the flow passage 110 (shown by the arrow "A" in FIG. 3) including the water wheel chamber 50 to perform power generation as described below.

In the hydraulic power generating device 100, the water flowing from the fluid inlet port 12 collides on the injection wall part 201 and turns upward. Then, the water passes through the conduit passage 27 formed as the recessed part 26 between the ring-shaped face 18 of the main body case 1 and the cover 15 and ejected to the blades 31 of the water wheel 3 of the water wheel chamber 50 from the respective ejection ports 221, 222, 223 and 224. As a result, the water wheel 3 rotates. The water having turned the water wheel 3 falls to the discharge space 25 formed at the lower part and flows to the fluid outlet port 13.

Effects of First Embodiment

As described above, in the first embodiment of the present invention, the ejection ports 221, 222, 223 and 224 are formed between the main body case 1 and the cover 15, and thus the cover 15 can be provided with the ribs 221a, 222a, 223a and 224a for adjusting the respective aperture areas of the ejection ports 221, 222, 223 and 224. Therefore, without newly remaking the main body case 1, the respective aperture areas of the ejection ports 221, 222, 223 and 224 can be adjusted by selecting whether a rib on the cover 15 is formed or not, or by changing the protruding size of the rib to be formed. Accordingly, the aperture areas can be adjusted without changing design of the ejection ports 221, 222, 223 and 224, and thus the hydraulic power generating device 100 can be manufactured at a low cost and a short time of delivery. Moreover, in the embodiment of the present invention, the ribs 221a, 222a, 223a and 224a are formed on the cover 15 of which the design change is easy and the cost for the molding die is low. Therefore, by having prepared beforehand for a cover without ribs, a cover having ribs, and a cover having different sizes of ribs and selecting one of them, the aperture areas of the ejection ports 221, 222, 223 and 224 can be easily adjusted. According to the construction described above, the hydraulic power generating device 100 can attain a low cost and a short time of delivery.

Also, in the first embodiment of the present invention, the protruding sizes of the ribs 221a and 224a corresponding to the ejection ports 221 and 224 at a large flow rate are set to be smaller to increase the aperture areas of the ejection ports 221 and 224, while the protruding sizes of the ribs 222a and 223a corresponding to the ejection ports 222 and 223 at a small flow rate are set to be larger to decrease the aperture areas of the ejection ports 222 and 223. Therefore, water is ejected to the blades 31 at an approximately equal flow rate from the ejection ports 221, 222, 223 and 224. Furthermore, the ejection ports 221 and 224 at symmetrical positions and the ejection ports 222 and 223 at symmetrical positions are respectively set to be the same aperture area, and thus the water wheel 3 can be turned uniformly. Consequently, power generation can be increased while suppressing the resistance of the entire water passage.

Modified Examples

In the first embodiment of the present invention, the protruding sizes of the ribs 221a, 222a, 223a and 224a to the ejection ports 221, 222, 223 and 224 are set to be different from each other, but their protruding sizes may be set to be the same.

Further, in the embodiment of the present invention, the grooves which are the ejection ports are formed on the main body case 1 and the protrusion parts fitted to the grooves for adjusting the aperture areas of the ejection ports are formed on the cover 15. However, the grooves for the ejection ports may be formed on the cover 15 and the protrusion parts fitted to the grooves for adjusting the aperture areas of the ejection ports may be formed on the main body case 1.

Second Embodiment

Next, a hydraulic power generating device in accordance with a second embodiment of the present invention will be described below with reference to FIGS. 8 through 11. The overall basic construction is the same as the construction of the first embodiment described above with reference to FIGS. 1 through 7. Therefore, the same constructional elements of the second embodiment are referred to as the same notational symbols of the above-mentioned first embodiment and only different construction is described below.

Figure 8:
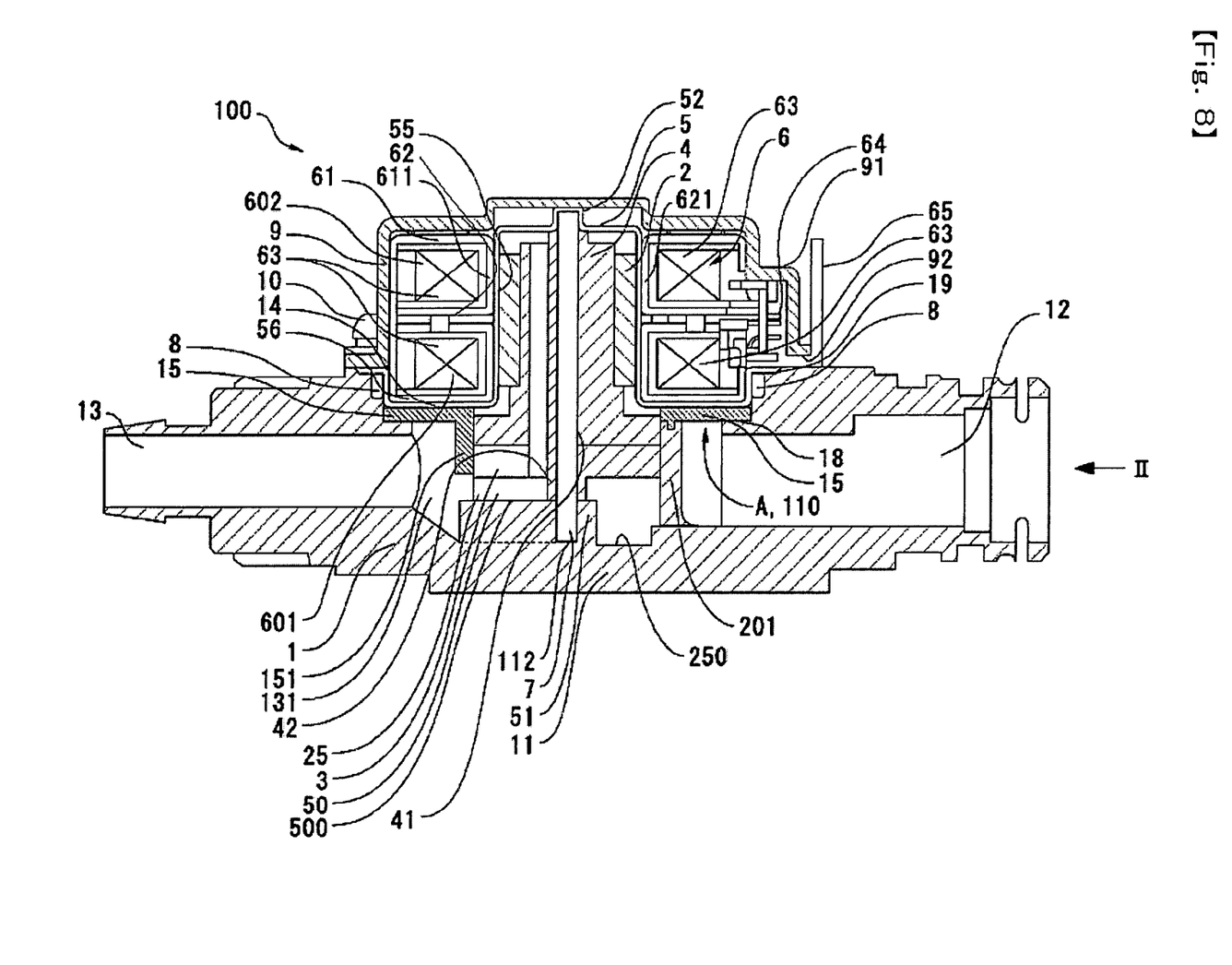
FIG. 8 is a longitudinal sectional view showing a small-sized hydraulic power generating device in accordance with a second embodiment of the present invention.
Figure 9:
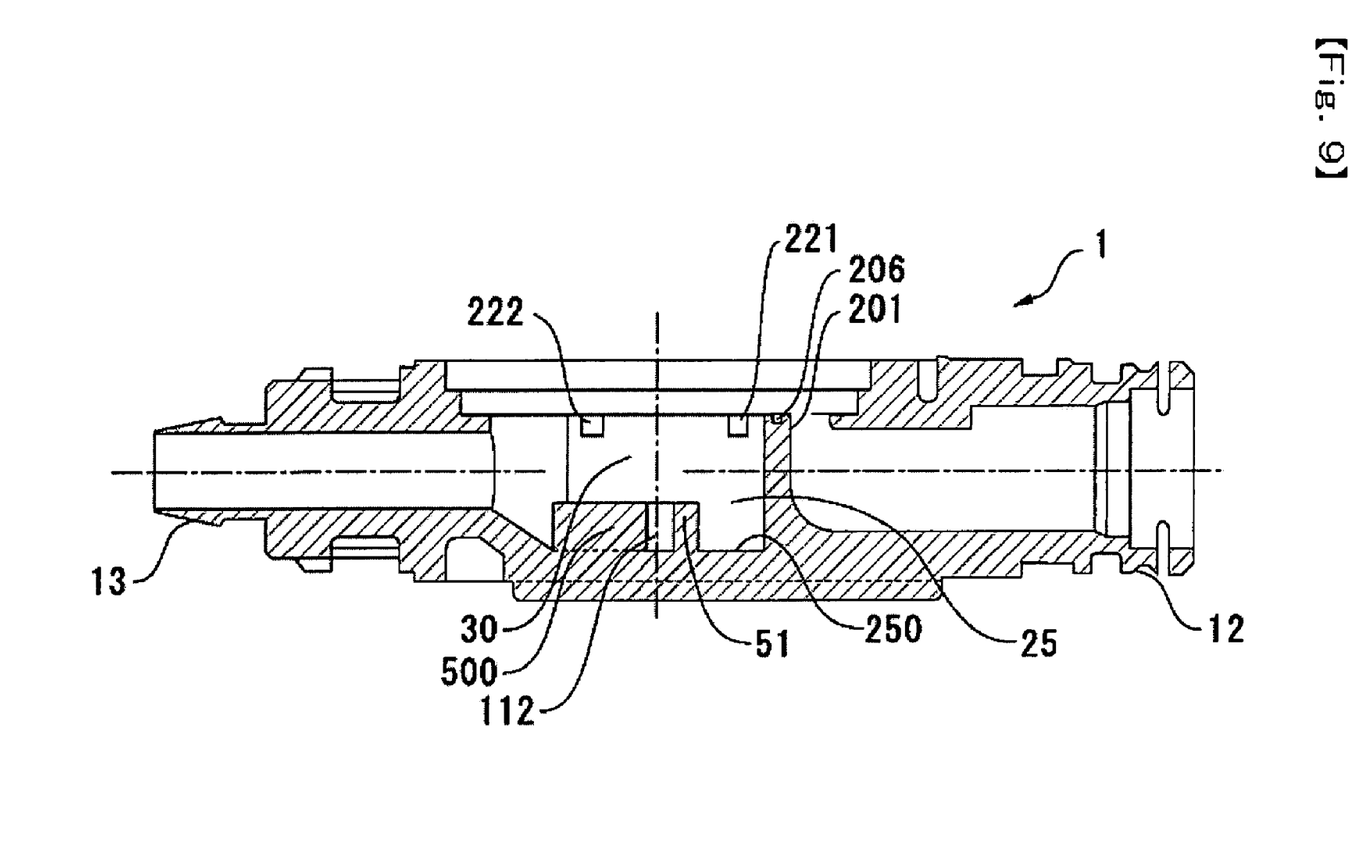
FIG. 9 is a sectional view showing a main body case used in the small-sized hydraulic power generating device shown in FIG. 8.
Figure 10:
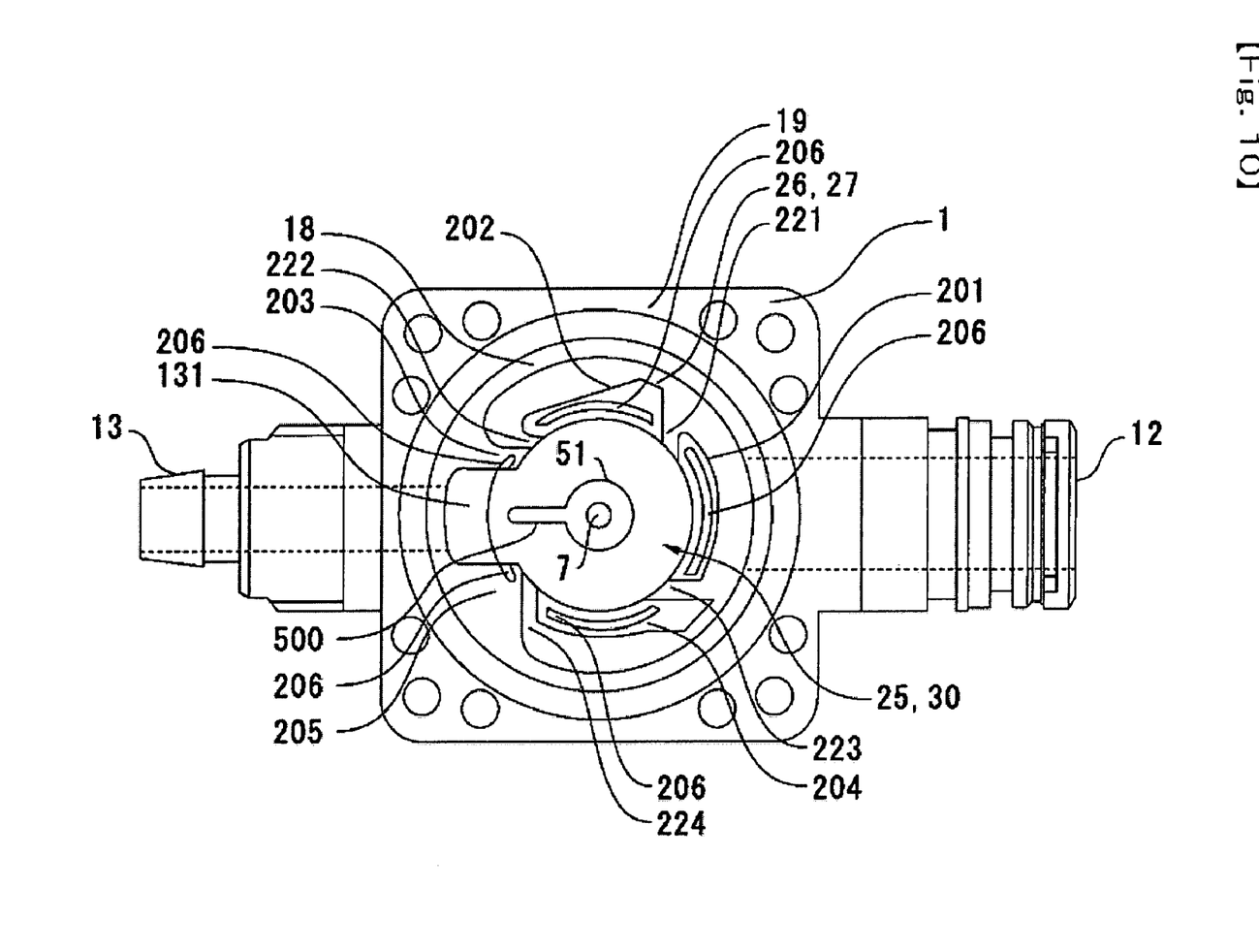
FIG. 10 is a plan view showing the main body case used in the small-sized hydraulic power generating device shown in FIG. 8.

As shown in FIGS. 8, 9 and 10, a bearing hole 112 for supporting the lower end of the support shaft 7 is formed at a lower position of the water wheel chamber 50. The bearing hole 112 is formed on the upper face of a cylindrical boss 51 which is protruded from the bottom face 250 in the axial direction of the water wheel chamber 50. When the rotation body 4 is attached on the support shaft 7, a discharge space 25 is formed at the lower position of the water wheel chamber 50 such that the height of the discharge space 25 is determined by adding the height size of a projection 42 protruding from the lower part of the water wheel 3 of the rotation body 4 to the height size of the boss 51. The discharge space 25 as constructed above is formed in a cylindrical space as similar to the water wheel chamber 50.

Figure 11:
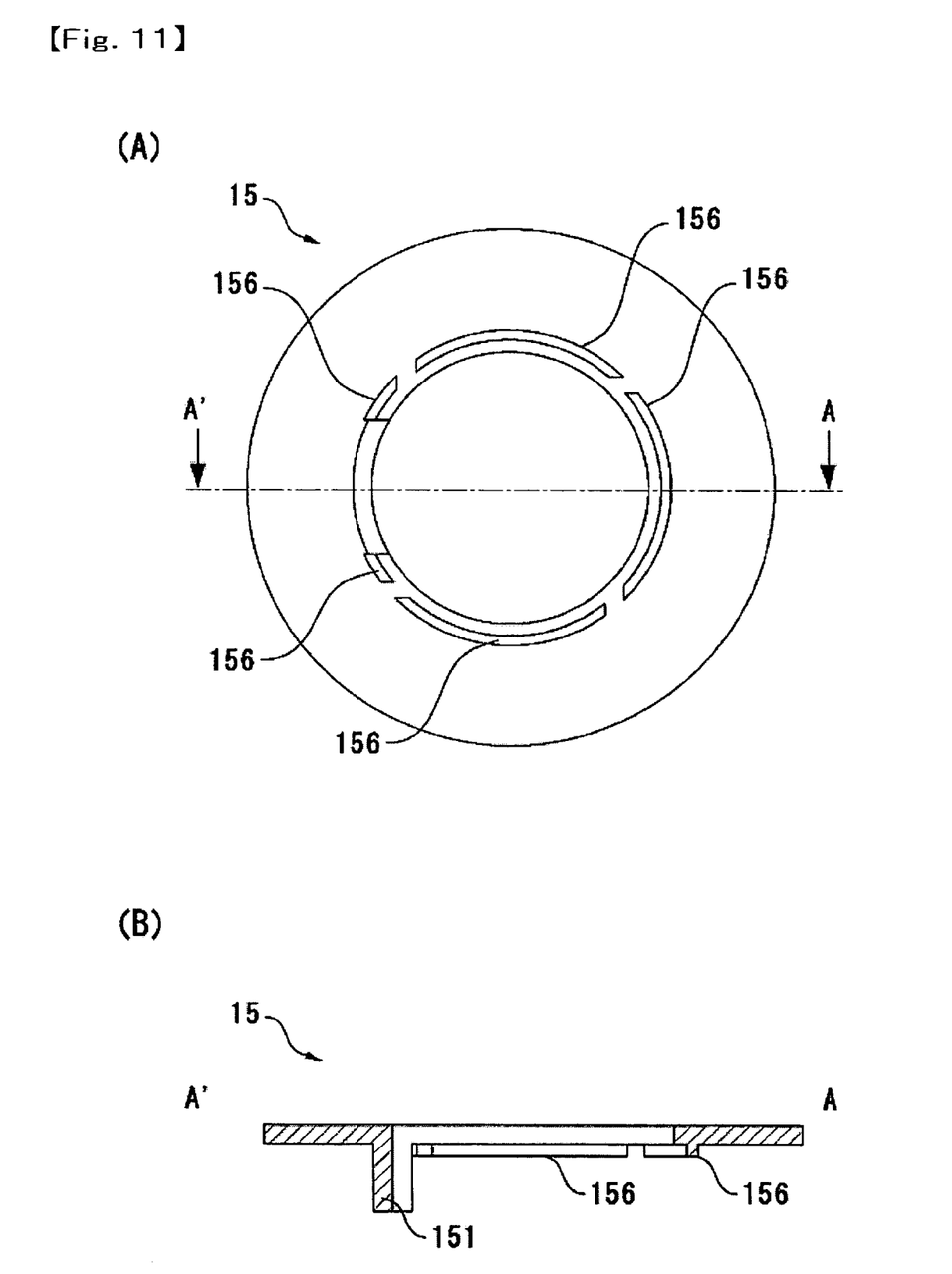
FIG. 11(A) is a bottom view showing a cover constructing an ejection port along with the main body case in the small-sized hydraulic power generating device shown in FIG. 8.
FIG. 11(B) is a sectional view showing the cover.

In the second embodiment of the present invention which is different from the first embodiment shown in FIG. 6, as shown in FIG. 11, the ribs 221a, 222a, 223a and 224a (protrusion part) are not provided for adjusting the aperture area of the ejection ports 221, 222, 223 and 224 at positions corresponding to the ejection ports 221, 222, 223 and 224.

In the second embodiment of the present invention, a stagnation preventing protrusion part 500 which is a rib is formed on the bottom face 250 of the discharge space 25 in the axial direction with respect to the water wheel 3 and formed from the boss 51 toward outside in the radial direction, for example, toward the fluid outlet port 13. The stagnation preventing protrusion part 500 is formed to be extended from the boss 51 with the same height as the boss 51.

Accordingly, in the hydraulic power generating device 100, the water flowing from the fluid inlet port 12 collides on the injection wall part 201 and turns upward. Then, the water passes through the conduit passage 27 formed as the recessed part 26 between the ring-shaped face 18 of the main body case 1 and the cover 15 and ejected to the blades 31 of the water wheel 3 of the water wheel chamber 50 from the respective ejection ports 221, 222, 223 and 224. As a result, the water wheel 3 rotates. The water having turned the water wheel 3 falls to the discharge space 25 formed at the lower part and flows to the fluid outlet port 13.

The discharge space 25 is formed in an approximately cylindrical space as similar to the water wheel chamber 50 and the boss 51 is protruded from the bottom face 250. Since the water wheel 3 rotates at the upper position of the discharge space 25 at a high speed, the water having fallen may be circulated around the boss 51 in the discharge space 25 without being ejected toward the fluid outlet port 13. However, in the second embodiment, the stagnation preventing protrusion part 500 is formed from the boss 51 toward the fluid outlet port 13 and thus the water is prevented from circulating around by the stagnation preventing protrusion part 500 and the flow to the fluid outlet port 13 is facilitated. Further, in the case that the hydraulic power generating device 100 in this embodiment is connected at a position on the way of water supply, air bubbles are easy to get mixed in the city water and such air bubbles may be circulated around the boss 51 in the discharge space 25. However, in the second embodiment, the circulation of the water is prevented by the stagnation preventing protrusion part 500 and the flow of the water to the fluid outlet port 13 is facilitated, and thus the flow of the air bubbles to the fluid outlet port 13 is also facilitated.

Effects of Second Embodiment

As described above, in the second embodiment of the present invention, the discharge space 25 in communication with the fluid outlet port 13 is constructed at the lower position of the water wheel chamber 30 and the water having turned the water wheel 3 flows on the downstream side smoothly. Therefore, a high degree of efficiency for power generation can be attained. Further, when the discharge space 25 is constructed as described above, the water circulates within the discharge space 25 at a high speed and thus air bubbles mixed in the water are hard to be ejected from the discharge space 25 toward the fluid outlet port 13. However, in the second embodiment of the present invention, since the stagnation preventing protrusion part 500 is formed on the bottom face 250 of the discharge space 25, the circulation of water in the discharge space 25 is prevented and the water is facilitated to flow to the fluid outlet port 13 along with the air bubbles. Moreover, the stagnation preventing protrusion part 500 is formed on the bottom face 250 in the discharge space 25 so as to prevent the water from circulating along the bottom face 250 at a high speed. Therefore, the water is facilitated to flow out to the fluid outlet port 13 along with the air bubbles. Accordingly, the occurrence of impact sounds due to repeating that the air bubbles collide on the inner face of the discharge space 25 can be prevented.

Further, since the ejection of the water from the discharge space 25 to the fluid outlet port 13 is facilitated by the stagnation preventing protrusion part 500, unnecessary resistance to the water wheel 3 due to the return current or circulation of the water is eliminated. Accordingly, the efficiency of the power generation is further improved.

In the embodiment of the present invention, the water wheel chamber 50 and the discharge space 25 are formed in a cylindrical space and the boss 51 for supporting the lower end part of the support shaft 7 of the water wheel 30 is formed at the center portion of the bottom face 250 of the discharge space 25. Therefore, the water and the air bubbles may be circulated around the boss 51 within the discharge space 25. However, since the stagnation preventing protrusion part 500 is formed in the discharge space 25, the occurrence of impact sounds due to repeating that the air bubbles collide on the inner face of the discharge space 25 can be prevented and the efficiency of the power generation is further improved.

Modified Examples

In the second embodiment of the present invention, the stagnation preventing protrusion part 500 is formed with the boss 51 in an integral manner. However, the stagnation preventing protrusion part 500 may be separated from the boss 51 so as to facilitate the outflow of the water and the air bubbles in the discharge space 25. Further, in the second embodiment of the present invention, the stagnation preventing protrusion part 500 is formed in the direction from the boss 51 to the fluid outlet port 13. However, the stagnation preventing protrusion part 500 may be formed to be extended from the boss 51 in the radial direction of the water wheel 3 other than the direction from the boss 51 to the fluid outlet port 13. Moreover, by changing the configuration of the discharge space 25, the stagnation preventing protrusion part 500 may be formed on the inner peripheral side wall or the bottom face of the discharge space 25 so as to facilitate the outflow of the water and air bubbles.

As described above, in the hydraulic power generating device in accordance with the embodiment of the present invention, the ejection port is formed of the groove which is formed on one of the main body case and the cover and the other of the main body case and the cover is provided with the protrusion part for adjusting the aperture area of the ejection port by entering into the groove. Therefore, according to the construction described above, the member which is easier for design change or cheaper for the cost of molding die can be adopted to form the protrusion part with a required size for adjusting the aperture area of the ejection port. Consequently, the aperture area can be adjusted without changing design of the ejection port and thus the hydraulic power generating device can be manufactured at a low cost and a short time of delivery.

Further, in the hydraulic power generating device in accordance with the embodiment of the present invention, the discharge space is formed at a downstream position of the water wheel chamber so as to be in communication with the fluid outlet port. Therefore, the fluid having turned the water wheel for power generation flows downstream side smoothly and thus a high degree of efficiency for power generation can be attained. Further, when the discharge space is constructed as described above, the fluid circulates within the discharge space at a high speed and thus air bubbles mixed in the fluid are hard to be ejected from the discharge space toward the fluid outlet port. However, in the embodiment of the present invention, since the stagnation preventing protrusion part is formed on the bottom face of the discharge space, the circulation of fluid in the discharge space is prevented and the fluid is facilitated to flow to the fluid outlet port along with the air bubbles. Accordingly, the occurrence of impact sounds due to repeating that the air bubbles collide on the inner face of the discharge space can be prevented. Also, since the ejection of the fluid from the discharge space to the fluid outlet port is facilitated by the stagnation preventing protrusion part, unnecessary resistance to the water wheel due to the return current or circulation of the water is reduced. Accordingly, the efficiency of the power generation is further improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A hydraulic power generating device comprising:
   a main body case which forms a flow passage provided with a water wheel chamber between a fluid inlet port and a fluid outlet port;
   a cover which covers an upper face of the main body case;
   a water wheel for power generation which is disposed in the water wheel chamber;
   a rotor magnet which rotates in cooperation with the water wheel for power generation;
   at least an ejection port including a groove which is formed on one of the main body case and the cover for ejecting fluid toward blades of the water wheel for power generation at a high speed; and
   at least an protrusion part which is formed on the other of the main body case and the cover for adjusting an aperture area of the ejection port by entering into the groove.

2. The hydraulic power generating device according to claim 1, wherein the groove for forming the ejection port is formed on the upper face of the main body case and the protrusion part is formed on an under face of the cover.

3. The hydraulic power generating device according to claim 2, further comprising:
   a ring-shaped recessed part formed on the upper face of the main body case;
   a ring-shaped conduit passage which is constructed by the ring-shaped recessed part of the main body case and the cover;
   a plurality of ejection ports formed on the upper face of the main body case for ejecting fluid from the ring-shaped conduit passage toward the blades of the water wheel for power generation; and
   a plurality of protrusion parts formed on the cover for adjusting aperture areas of the respective ejection ports.

4. The hydraulic power generating device according to claim 3, wherein the plurality of protrusion parts include those with different protruding sizes.

5. The hydraulic power generating device according to claim 1, wherein the fluid is water ejected from a faucet.

6. A hydraulic power generating device comprising:
   a flow passage provided with a water wheel chamber between a fluid inlet port and a fluid outlet port;
   a water wheel for power generation which is disposed in the water wheel chamber;
   a rotor magnet which rotates in cooperation with the water wheel for power generation;
   a discharge space formed at a downstream position of the water wheel chamber so as to be in communication with the fluid outlet port, to which fluid after having rotated the water wheel for power generation is ejected; and
   a stagnation preventing protrusion part which is formed in the discharge space to facilitate flow of air bubbles to the fluid outlet port.

7. The hydraulic power generating device according to claim 6, wherein the water wheel chamber and the discharge space are respectively formed in a cylindrical space.

8. The hydraulic power generating device according to claim 6, wherein the stagnation preventing protrusion part is formed on a bottom face of the discharge space at the downstream position of the water wheel chamber.

9. The hydraulic power generating device according to claim 8, further comprising a boss formed on the bottom face of the discharge space for supporting a lower end part of a rotation center shaft of the water wheel for power generation.

10. The hydraulic power generating device according to claim 9, wherein the stagnation preventing protrusion part is a rib which extends from the boss in a radial direction.

11. The hydraulic power generating device according to claim 10, wherein the stagnation preventing protrusion part is formed to be extended from the boss toward the fluid outlet port.

12. The hydraulic power generating device according to claim 6, wherein the fluid is water ejected from a faucet.

* * * * *